United States Patent
Sandschaper

[11] 3,824,731
[45] July 23, 1974

[54] FISH LINE LIGHT

[76] Inventor: Delmer J. Sandschaper, 3301 S. Trenton, Tulsa, Okla. 74105

[22] Filed: Sept. 18, 1972

[21] Appl. No.: 289,595

[52] U.S. Cl. .............................................. 43/17.5
[51] Int. Cl. ........................................... A01k 75/02
[58] Field of Search .............................. 43/17, 17.5

[56] References Cited
UNITED STATES PATENTS

| | | | |
|---|---|---|---|
| 2,654,972 | 10/1953 | Hollingsworth | 43/17 |
| 3,608,227 | 9/1971 | Adams | 43/17 |
| 3,656,251 | 4/1972 | Snyder et al. | 43/17 |
| 3,693,278 | 9/1972 | Mahone | 43/43.1 |

Primary Examiner—Robert Peshock
Assistant Examiner—J. Q. Lever
Attorney, Agent, or Firm—Head & Johnson

[57] ABSTRACT

This invention describes a fishing line light which is designed to have negative buoyancy so that it will sink in the water. It comprises a water-tight case, at least the bottom part of which is of translucent material. Inside the case is a lamp, a battery and a pair of contacts normally held apart by spring means. The device is supported by a cord attached to a float on the surface of the water, and a fish hook is attached to a cord which also is attached to a part of the device.

In one version of the apparatus the contacts are mounted one on each of the battery and the lamp. The fish line is attached to the battery while the support cord is attached to the lamp and the case. When the fish pulls on the hook, the contacts are brought together and the lamp is lighted. The lamp is on the bottom end of the case and illuminates the water area around the case for the purpose of attracting fish. The spring is fairly weak so that a very small pull on the hook will cause the lamp to be lighted. It is the flickering light due to momentary or extended contacts that is used to attract the fish to the hook.

4 Claims, 6 Drawing Figures 3,824,731

FISH LINE LIGHT

BACKGROUND OF THE INVENTION

This invention lies in the field of fishing devices. More particularly this invention is concerned with a fishing accessory suspended under the water, by means of which a lamp can be lighted by a pull on the fish hook. The purpose of the light is to attract fish to the fish hook.

In the prior art there are a number of devices which include, in a container, a battery, a lamp and a pair of contacts. The contacts can be closed by various means, including a pull on the fish hook line. However, all of these devices are either attached to the fishing pole or are adapted to be floated on the surface of the water, with the lamp in the upper portion of the container, where it can be readily seen by the fisherman. The light therefore is used strictly as a means of indicating to the fisherman that a bite has been made.

SUMMARY OF THE INVENTION

It is a primary object of this invention to provide a device which can be supported below the surface of the water and which will provide a light each time there is a pull on the fish hook line. This and other objects are realized and the limitations of the prior art are overcome in this invention by providing a sealed container which is of negative buoyancy, and must be supported below the surface by a cord depending from a float on the surface of the water or other means.

Inside the container is a lamp, a battery and a pair of contacts. Means are provided so that the cord from the fish hook will, when pulled, with respect to a second cord depending from the float, cause the contacts to be closed and the lamp to be lighted, shining a light downwardly into the water, the purpose of which is to attract the fish to the device.

BRIEF DESCRIPTION OF THE DRAWINGS

These and other objects of this invention and a better understanding of the principles and details of the invention will be evident from the following description, taken in conjunction with the appended drawings, in which.

DESCRIPTION OF THE PREFERRED EMBODIMENT

Figure 1:
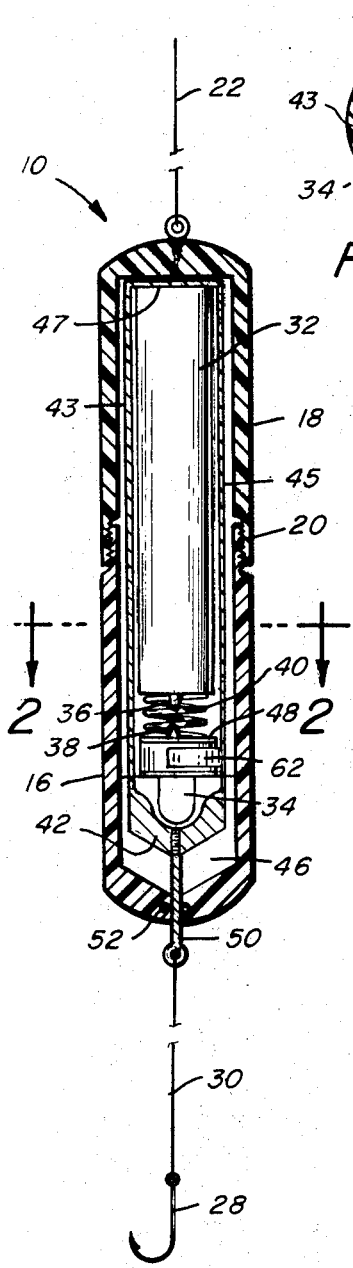
FIGS. 1 and 2 show one embodiment of the apparatus of this invention.
Figure 2:
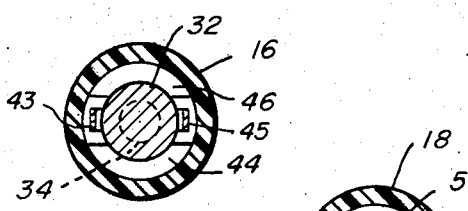
Figure 5:
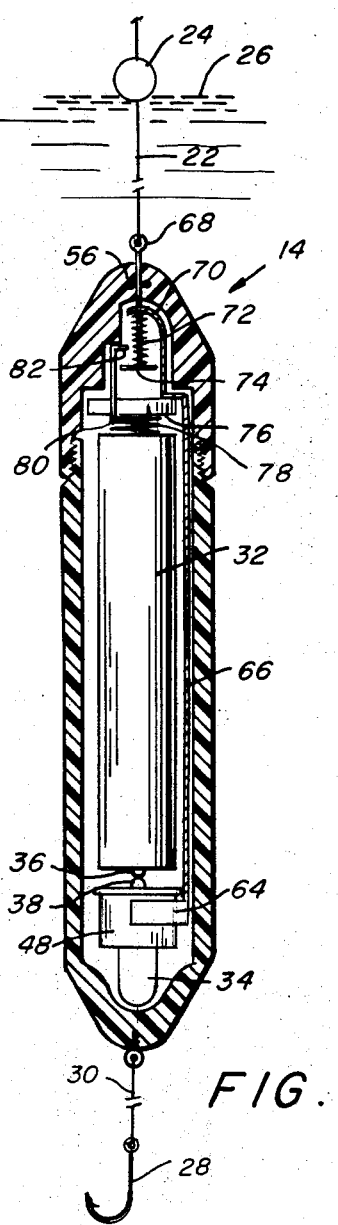
FIG. 5 shows a third embodiment of the invention.

Referring now to the drawings and in particular to FIGS. 1 and 2, there is shown, indicated by numeral 10, one version of the fish line light of this invention. It comprises a two-part cylindrical container having a bottom portion 16 of translucent material and an upper portion 18, which are held sealed together by some means, such as the threads 20. Inside the container is a frame comprising a base portion 42, thin vertical straps 43 and 45 and a cross strap at the top 47. Inside of this frame is a lamp 34 having a base 48, and a battery 32. There are two contacts, 36 on the battery and 38 on the lamp, which are held apart by a coil spring 40 or similar means. The top part of the case 18 is attached to a cord 22, which as shown in FIG. 5 is supported from a float 24 resting on the surface 26 of the water in which the device is used.

The fish hook 28 is attached to a cord 30 which is attached to a plunger 50 sealed by means 52 through an axial opening in the bottom portion of the case 16. There are two short walls 46 and 44 in the lower part of the bottom portion which are spaced apart sufficiently to permit the lamp to be inserted between them but to provide a base against which the lamp is pressed downward by the spring 40. The plunger 50 is attached to the frame 42, which with the straps 43, 47, and 45 encircle the battery 32, holding the lamp, battery and spring together as a unit. When there is a pull downward on the hook 28, the plunger 50 is drawn down, carrying the frame 42, and forcing the battery downwardly. The lamp rests with its base against the walls 46 and 44 so that downward movement of the battery causes compression of the spring 40 until the contacts 36 and 38 are brought together. There is a contact 62 around the base of the lamp that is in electrical contact with the metal straps 43, 45 and 47, which are in contact with the case of the battery 32. When the contacts 36 and 38 are brought together, the lamp 34 will be lighted.

The lower portion 16 of the container is made of translucent or transparent plastic so that when the lamp is lighted the light will be directed downwardly into the body of water and will serve as an attraction for fish to swim toward the device. When the pull is released the spring then lifts the battery, breaking the contact and permitting the light to go out.

Figure 3:
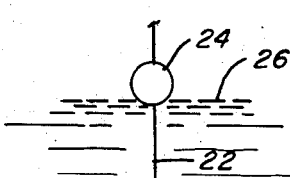
FIGS. 3 and 4 show a second embodiment.
Figure 4:
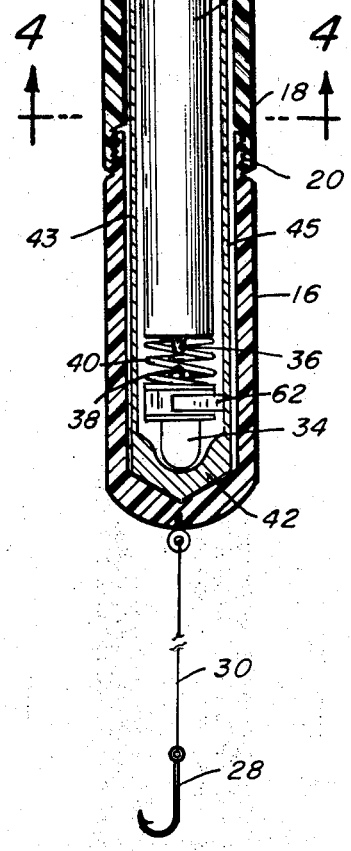

FIG. 3 shows a similar design identified by the numeral 12. However, instead of having the lamp fixed to the case and the battery moveable as in FIG. 1, in FIGS. 3 and 4 the lamp moves with the frame and the battery is held against the case. Again the case is divided into two cylindrical portions 16 and 18 and the battery, spring and lamp are held in the frame 42 as before. There are two walls cast in the upper portion of the part 18 which press on the base of the battery, leaving space for the frame member 47, however. The fish hook 28 is connected to line 30 which is connected to the case 16 and the support line 22 is attached to a plunger 54 sealed by means 56 axially through the upper portion 18 of the case. Thus, the frame is supported in fixed position and when there is a pull on the hook 28, the case is drawn downward, pushing the battery down into contact with the lamp to light the lamp.

A third version of the device is shown in FIG. 5 wherein the lamp and the battery are in contact with each other, pressed into contact by means of the spring 78 between the top of the battery and a contact 80 which connects to a contact 82. The base of the lamp is connected by contacts 64, 66 and 70, and the plunger 68. The plunger 68 attached to the float 24, is sealed through the top of the container, passes through the contact 70, and is pressed downwardly by means of spring 72. Thus, there is no contact between the parts 74 and 82. However, when there is a pull on the hook 28 and line 30, the case is pulled downwardly and the contacts 74 and 82 are connected against the push of the spring 72 and the lamp is lighted.

Figure 6:
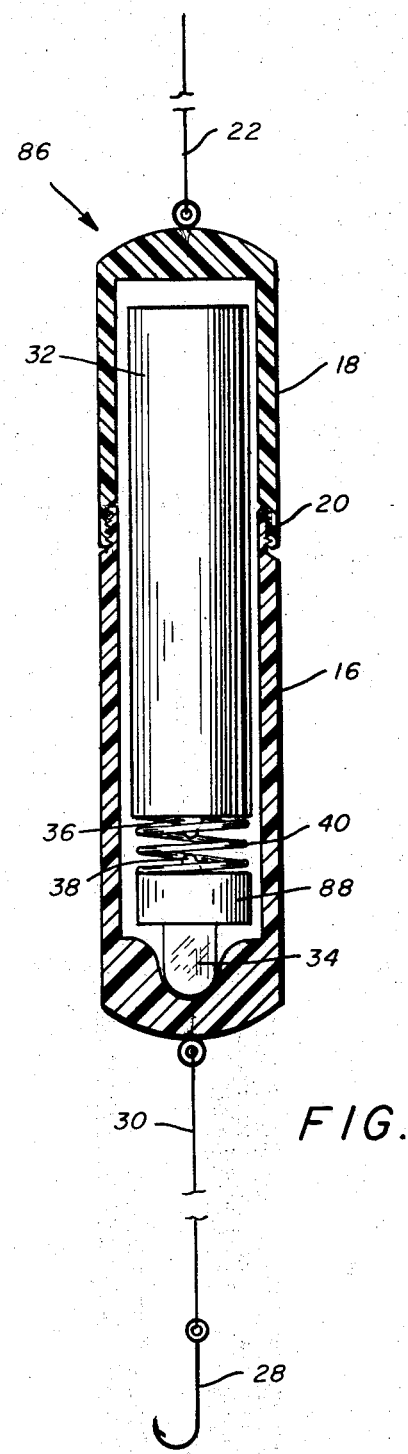
FIG. 6 shows a fourth embodiment of the invention.

In FIG. 6 is shown a fourth embodiment of this invention, indicated generally by the numeral 86. As in FIG. 1, it comprises a case made of two parts 18, 16, at least the lower part 16 of which is made of translucent material. The parts are joined and sealed by means such as threads 20. There is a battery 32 slidable in the case, and a lamp bulb 34 with base 88 and center contact 38. The battery case is grounded to the lamp base by means of the helical wire spring 40 which makes contact with both metal parts. The spring 40 supports the battery so that the battery contact 36 is slightly separated from the lamp contact 38.

In use, the top end 18 of the container is supported, as by a float by cord 22. A fish hook is supported by the bottom end 16 of the container. When a downward force is applied to the hook, the container and float are pulled down. When the force is removed, the float pulls the container up. Because of the inertia of the battery, it lags behind, and the lamp bulb moves up to close the contacts 36, 38 and light the lamp. The spring 40 is a soft one, so that a pulsating force on the cord 30, or turbulence in the water, will cause the container to bob about. This will cause the battery to oscilate on the spring, and to periodically close the contacts, and flash the lamp, attracting the fish.

It will be clear also that by making the threads 20 on the case long enough, the upper part 18 can be screwed down far enough to force the battery 32 downward, compressing the spring 40 and holding the contacts 36, 38 closed. Thus, the light can be kept constantly on, or momentarily on.

The principal purpose of this device is to attract fish to the hook by means of the flashing on and off of the light inside of the container. The purpose of the device is not to inform the fisherman of a strike, but is simply for purposes of attracting fish. For this purpose, of course, the container must be immersed in the water, so that the device is made with a negative buoyancy and must be supported by a cord attached to a float or other means on the water surface. Also, the lamp is on the bottom end of the container where it will be most easily seen by the fish.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A fish line light adapted for immersion below the water surface to attract fish, comprising:
    a. a container, at least one portion of which is made of translucent material, sealed for water immersion;
    b. said container and enclosed parts of slightly negative buoyance, whereby said container will sink in the water;
    c. said container including therein lamp bulb means, battery means, and first and second contact means on said bulb and said battery respectively, said contacts held apart by a spring means which yet allows relative movement with respect to each other, a common conductor means to said battery and said lamp, said lamp bulb means adjacent said translucent material;
    d. said container attachable to a support cord and fish hook means, so that an oscillatory movement of said container will cause said battery and said lamp bulb to relatively oscillate with respect to each other to close and open said contacts and flickeringly light said lamp.

2. The fish line light as in claim 1 including means to continuously press said battery and said lamp bulb together to close said first and second contacts and to continuously light said lamp.

3. The fish line light as in claim 1 in which said fish hook means is attached to said one portion of said container, and said support cord means is connected to the other portion of said container.

4. The fish line light as in claim 1 wherein the oscillatory movement of said container will cause said first and second contacts to relatively oscillate with respect to each other to close and open and flickeringly light said lamp.

* * * * *